United States Patent
Sanik et al.

[11] Patent Number: 6,070,437
[45] Date of Patent: Jun. 6, 2000

[54] TIP-PLATE THERMOCOUPLE

[75] Inventors: Paul S. Sanik, Lewis Center; Eugene C. Varrasso, Heath; Susan M. Pierik, Chillicothe, all of Ohio

[73] Assignee: Owens Corning Fiberglas Technology, Inc., Summit, Ill.

[21] Appl. No.: 09/190,306

[22] Filed: Nov. 12, 1998

[51] Int. Cl.[7] .................................................. C03B 37/07
[52] U.S. Cl. ........................ 65/488; 65/495; 264/1.24; 264/40.1; 425/66; 425/72.2; 425/144
[58] Field of Search ........................ 65/484, 488, 495; 264/1.24, 1.6, 40.1, 40.6, 40.7; 425/66, 72.2, 135, 143, 144

[56] References Cited

U.S. PATENT DOCUMENTS

| | | | |
|---|---|---|---|
| 3,012,373 | 12/1961 | Willis | 222/56 |
| 3,265,476 | 8/1966 | Roberson | 65/486 |
| 3,649,231 | 3/1972 | Trethewey | 65/384 |
| 4,167,403 | 9/1979 | Coggin | 65/493 |
| 4,285,712 | 8/1981 | Thompson | 65/381 |
| 4,738,700 | 4/1988 | Grundy | 65/488 |
| 4,746,344 | 5/1988 | Kuhn et al. | 65/488 |
| 4,780,120 | 10/1988 | Varrasso et al. | 65/29.19 |
| 4,794,625 | 12/1988 | Grundy | 373/28 |
| 5,071,459 | 12/1991 | Kuhn | 65/384 |
| 5,620,493 | 4/1997 | Arterburn | 65/377 |

*Primary Examiner*—Sean Vincent
*Attorney, Agent, or Firm*—Inger H. Eckert

[57] ABSTRACT

A glass-fiber bushing including a bottom tip-plate and side walls surrounding the bottom tip-plate forming a container for molten glass. The bottom tip-plate including a plurality of tips arranged to permit molten glass to flow there through to produce a multiplicity of individual molten glass streams from which glass fibers may be formed. The glass-fiber bushing includes at least one tip-plate thermocouple having a platinum tube housing, a pair of thermocouple wires transversing the tube housing and terminating in a weld junction. The tube housing, thermocouple wires and the weld are attached directly to the tip-plate such that the thermocouple junction is formed directly at the tip-plate surface.

11 Claims, 2 Drawing Sheets

TIP-PLATE THERMOCOUPLE

TECHNICAL FIELD AND INDUSTRIAL APPLICABILITY OF THE INVENTION

The present invention relates to a glass-fiber bushing including a tip-plate thermocouple. More particularly, the present invention relates to a glass-fiber bushing including a tip-plate thermocouple for obtaining the temperature measurement indicative of the throughput of the glass-fiber bushing.

BACKGROUND OF THE INVENTION

Fiberglass is currently produced from glass-fiber bushings that typically are controlled to maintain the temperature of the glass contained in the forming restrictions (tips) within a desired range. Maintenance of a desired glass temperature insures uniform viscosity of the molten glass in a forming restrictions (tips) and thus uniform filament formation as fibers are drawn from the molten glass as it exits through the forming restrictions, e.g., bushing orifices, all other conditions being equal. The bushings themselves are precious metal containers typically having four sides and a bottom and are generally open at the top. The bushings are provided with a plurality of forming restrictions, e.g., orifices, in the bottom which normally have tips depending therefrom through which the molten glass contained in the bushing flows to form the glass fibers. Bushings are heated by applying current to leads located at each end of the bushing, the leads being connected to the secondary winding of a suitably sized power transformer. The current is increased or decreased by connecting a power pack to the power transformer and altering the output of the power pack by feeding signals to it from a controller that is fed signals from thermocouples attached to the bushing that monitor its operating temperatures continuously.

The throughput of a glass-fiber bushing, under stable operating conditions, is determined by the average temperature of the glass in the forming restrictions. A common technique for determining the temperature of the glass in the forming restrictions is by the use a thermocouple placed on the bushing's front side wall, close to the tip plate (bottom). While the present technique utilized to measure bushing temperatures appears adequate in that the temperature does represent the measurements taken from the bushing, they are not necessarily adequate because they do not necessarily represent the real temperature of the forming restrictions or of the tip-plate. This is so because conventional measurements made do not usually represent the bushing tip-plate temperature. It will be appreciated that substantial temperature gradients exist within the bushing, so this measurement only approximates the temperature in the tips. Also, because the thermocouple is located away from the tips, there is a lag between changes observed in the side wall and throughput changes occurring in the forming restrictions.

Accordingly, it is an object of the present invention to improve the temperature measurement of a glass-fiber bushing at the tip-plate. In measuring the temperature of the bushing tip-plate, it is an important consideration that the thermocouple junction be attached to the top of the tip-plate of the bushing. The present invention provides improved temperature measurement by placing the point of measurement on the tip-plate. Consequently, the present invention provides improved speed of response, less cold-start or hot-start yardage and reduced variability in the yardage of the fiber glass produced.

SUMMARY OF THE INVENTION

Briefly, according to the invention there is provided a glass-fiber bushing including a bottom tip-plate and side walls surrounding the bottom tip-plate forming a container for molten glass. The bottom tip-plate including a plurality of tips arranged to permit molten glass to flow there through to produce a multiplicity of individual molten glass streams from which glass fibers may be formed. The glass-fiber bushing includes at least one tip-plate thermocouple having a platinum tube housing, a pair of thermocouple wires transversing the tube housing and terminating in a weld junction. The tube housing and the weld are attached directly to the tip-plate such that the thermocouple junction is formed at the top of the tip-plate surface.

BRIEF DESCRIPTION OF THE DRAWINGS

Further features and other objects and advantages of this invention will become clear from the following detailed description made with reference to the drawings in which.

DETAILED DESCRIPTION AND PREFERRED EMBODIMENTS OF THE INVENTION

Figure 1:
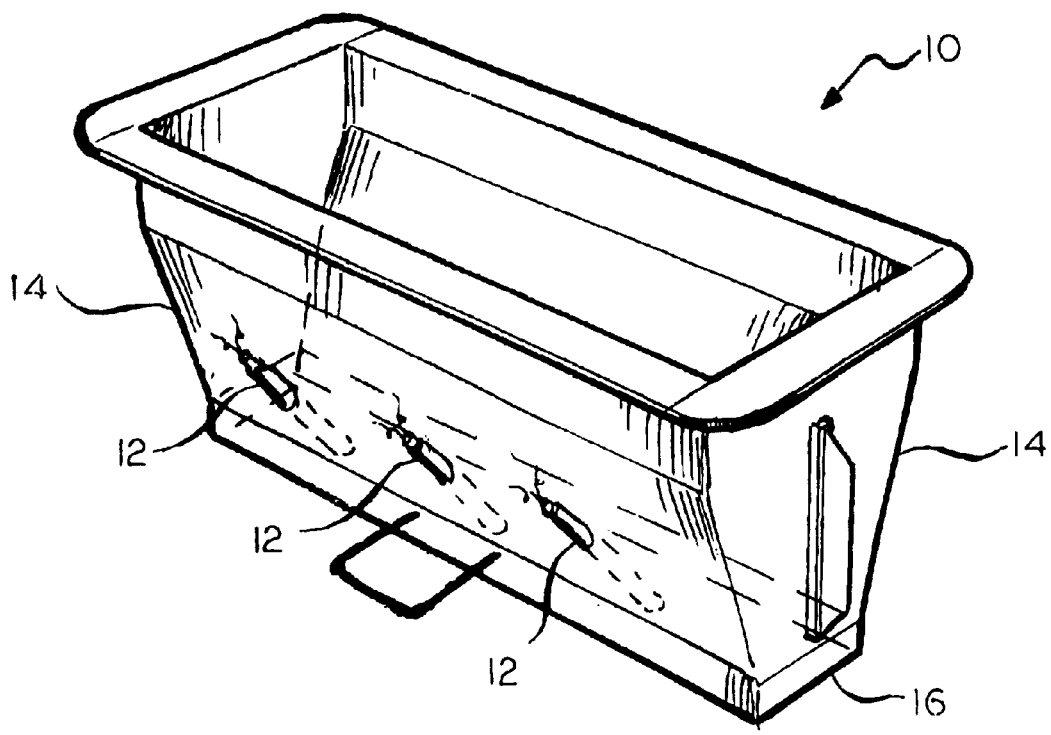
FIG. 1 is a perspective view of a glass-fiber bushing including three tip-plate thermocouples in accordance with the present invention.
Figure 4:
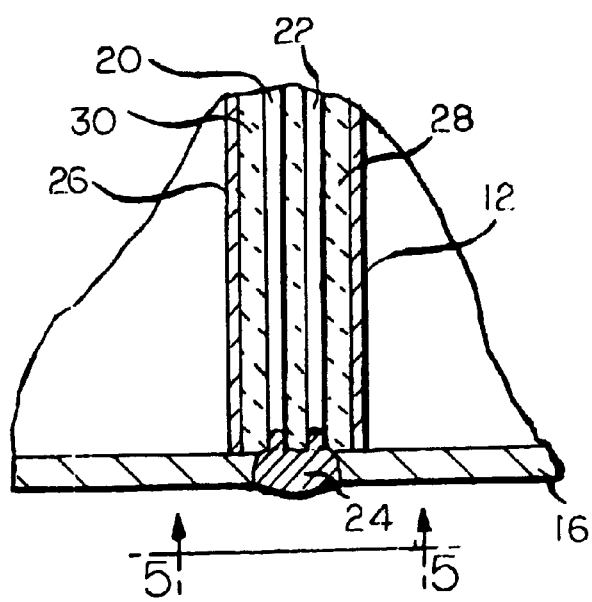
FIG. 4 is an enlarged partial cross sectional view of the tip-plate thermocouple.

Referring to the figures, wherein like elements are represented by like reference characters there is illustrated a foremelter-type glass-fiber bushing 10 including a tip-plate thermocouple 12. The glass-fiber bushing 10 is a rectangular shaped bushing having side walls 14 and a bottom or tip-plate 16. The tip-plate 16 includes a plurality of forming restrictions 18, e.g. orifices including tips, arranged in rows for the exit of molten glass. The glass-fiber bushing 10 is provided with a bushing flange which is normally utilized in operation to bolt or affix the glass-fiber bushing to a bushing block located above it and through which molten glass flows from a glass fiber forming forehearth to the bushing. The flow of molten glass provides a constant supply of molten glass to the glass-fiber bushing 10 so that glass fibers may be continuously drawn therefrom. It will be understood by the skilled artisan that side walls 14 are normally provided with electrical connections so that the glass-fiber bushing can be connected to a suitable power supply such as the secondary winding of an AC power transformer for delivering electrical energy to the bushing during its operation thereby providing sufficient heat to the glass-fiber bushing to maintain the glass contained therein in the molten condition.

In operation, the throughput in the glass-fiber bushing 10 may be described by the following equation:

$$Q = K1 \times h/u$$

$u = K2/T$ (approximation of the Fulcher equation for small changes in T)

wherein, h = head u = glass viscosity

T = temperature in the restriction

The geometry of the glass-fiber bushing 10 is considered to be constant and therefore does not typically affect throughput. Although, over time, the glass-fiber bushing may sag and warp, it will be appreciated that the changes in glass-fiber bushing geometry occur so slowly over time that the standard throughput checks and adjustments compensate for any changes in glass-fiber bushing geometry.

The head is composed of two parts, the positive head due to the level of molten glass above the forming restrictions and the negative head from the forming cone of the glass pulled from a winder below. The level of glass above the forming restrictions is well-controlled and can be considered to be constant. The forming cone pressure in the region of pulling speeds typically used, is also assumed to be essentially constant.

The viscosity is also composed of two parts. Viscosity changes due to changes in glass composition and viscosity changes due to changes in temperature. Glass composition, is generally well controlled and in most cases changes were noticed by various cross-checks. As a result, the most significant factor in throughput changes is temperature-induced changes in viscosity. Accordingly, the more accurately the temperature of the glass in the forming restrictions is known, the better the throughput can be controlled.

The tip-plate thermocouple 12 in accordance with the present invention attempts to obtain a measurement of the temperature of the glass in the forming restrictions by measuring the temperature of the glass as close as possible to the forming restrictions. It will be appreciated that since each tip-plate thermocouple 12 can only measure one point, it is preferred that the point of temperature measurement be generally selected as the geometric center of the forming restriction pattern. However, in a multiple section bushing of a type well known in the art, multiple tip-plate thermocouples 12 may be used to obtain a separate temperature for each patch of forming restrictions with each thermocouple located near the center of the forming restrictions 18 associated with a particular patch. Since the throughput of a strand is the average of the throughput of all the forming restrictions 18 that contribute to forming the strand, and each tip-plate thermocouple 12 can only measure one point, the location of the tip-plate thermocouple on the tip-plate is selected as representative of the average of several forming restrictions.

Figure 5:
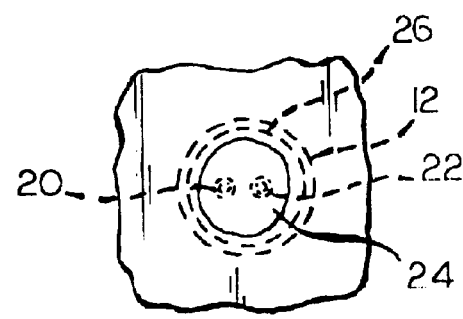
FIG. 5 is an enlarged partial view of the tip-plate thermocouple taken along line 5—5 of FIG. 4.
Figure 6:
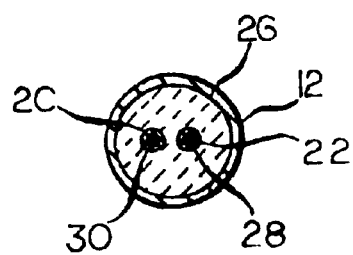
FIG. 6 is a cross sectional view of the tip-plate thermocouple taken along line 6—6 of FIG. 3.
Figure 2:
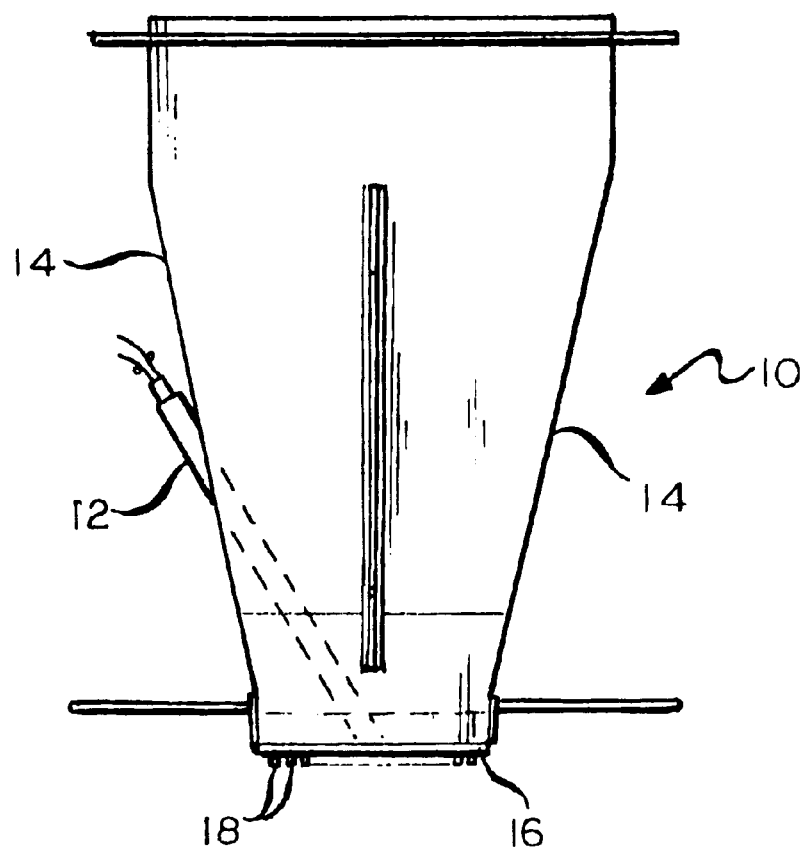
FIG. 2 is a side view of the glass-fiber bushing of FIG. 1.
Figure 3:
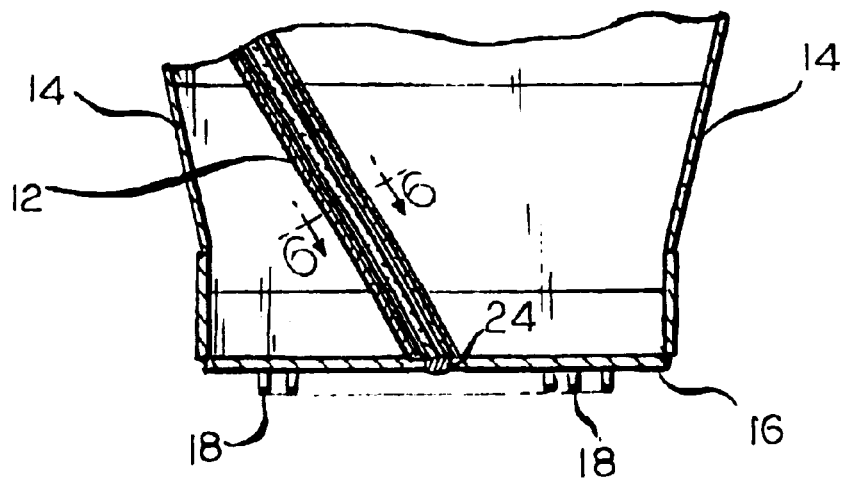
FIG. 3 is an enlarged partial cross sectional view of the glass-fiber bushing of FIG. 1.

Referring to FIGS. 1–6, the tip-plate thermocouple 12 is located directly on top of the tip-plate 16, preferably along the longitudinal centerline of the tip-plate. The tip-plate thermocouple 12 includes two thermocouple wires 20 and 22 and a weld junction 24 connecting the end of the thermocouple wires in the tip-plate 16 so that the temperature at the weld junction is substantially equal to the temperature of the top surface of the tip-plate 16. As shown in FIG. 5, the weld junction 24 is formed within an opening through the tip-plate 16 such that the weld junction is coplanar with the surface of the tip-plate. The thermocouple wires 20 and 22 are constructed of platinum and rhodium. The thermocouple wires 20 and 22 are contained in a pure platinum tube housing 26 that extends through the bushing side wall 14 to the weld junction 24. The tube housing 26 is welded to both the top surface of the tip-plate around the thermocouple weld junction 24 and to the bushing side wall 14. Inside of the tube housing 26, the thermocouple wires 20 and 22 are supported and separated by two-bore ceramic tubing 28 and 30 of a type well known in the art. The use of a pure platinum tube housing 26 is necessary so that rhodium, typically contained in previous alloy tube housings, will not vaporize from the alloy tube and condense on the thermocouple wires through joints or cracks in the ceramic tubing thereby changing the characteristics of the thermocouple wires and resulting in thermocouple drift. It has been found that attachment of the tube housing 26 and of the thermocouple weld junction 24 directly to the tip-plate 16 prevents buckling and separation problems that may occur between an intervening plate member and the tip-plate surface and allows for the formation of the thermocouple weld junction 24 directly at the tip-plate surface thereby improving the accuracy of the temperature measurement.

Once installed in the bushing 10, the tip-plate thermocouple 12 performs the same function as a conventional sidewall thermocouple. The tip-plate thermocouple 12 is operatively connected to a suitable control system of a type well known in the art and operates in the same manner as a sidewall thermocouple to provide electronic signals in response to temperatures sensed at the thermocouple junction.

The tip-plate thermocouple 12 reduces yardage variation because the thermocouple better represents what is controlling the yardage variation; the temperature of the glass in the forming restriction. The tip-plate thermocouple responds faster than a conventional sidewall thermocouple because the sidewall thermocouple, being farther away, suffers from a transport delay of the flowing glass, and a thermal delay through that glass.

The patents and documents described herein are hereby incorporated by reference.

Having described presently preferred embodiments of the present invention, the invention may be otherwise embodied within the scope of the appended claims.

What is claimed is:

1. A glass-fiber forming bushing comprising:
    a bottom tip-plate and side walls surrounding the bottom tip-plate to form a container for molten glass;
    a plurality of forming restrictions positioned in the bottom tip-plate and arranged to permit molten glass to flow therethrough to produce a multiplicity of individual molten glass strands from which glass fibers may be formed;
    at least one tip-plate thermocouple including a tube housing, a pair of thermocouple wires traversing the tube housing, and a weld junction;
    wherein the tube housing is attached directly to the tip-plate, and wherein the weld junction is formed coplanar with a surface of the tip-plate.

2. The glass-fiber bushing of claim 1 wherein the tube housing extends from the tip-plate through a side wall of the bushing.

3. The glass-fiber bushing of claim 1 wherein the wires are constructed of platinum and rhodium.

4. The glass-fiber bushing of claim 1 wherein the tube housing includes two-bore ceramic tubing to support and separate the thermocouple wires.

5. The glass-fiber bushing of claim 1 wherein the weld junction is formed within an opening through the tip-plate.

6. A glass-fiber bushing comprising:
    a bottom tip-plate and side walls surrounding the bottom tip-plate to form a container for molten glass,
    a plurality of forming restrictions positioned in the bottom tip-plate and arranged to permit molten glass to flow there through to produce a multiplicity of individual molten glass strands from which glass fibers may be formed;
    at least one tip-plate thermocouple including a platinum tube housing having two ceramic tubes, a pair of thermocouple wires transversing the tube housing within separate ceramic tubes and terminating in a weld junction, wherein the tube housing and the weld junction are attached directly to the tip-plate and the weld junction is formed within an opening through the tip-plate.

7. The glass-fiber bushing of claim 6 wherein the tube housing extends from the tip-plate through a side wall of the bushing.

8. The glass-fiber bushing of claim 6 wherein the weld junction is formed coplanar with the tip-plate surface.

9. A thermocouple for a glass-fiber forming bushing, the bushing including a tip-plate, side walls surrounding the tip-plate to form a container for molten glass, and a plurality of forming restrictions positioned in the tip-plate and arranged to permit molten glass to flow therethrough to produce a multiplicity of individual molten glass strands from which glass fibers may be formed, the thermocouple comprising:

a tube housing attached directly to the tip-plate;

a weld junction formed within an opening through the tip-plate, a temperature of the weld junction being substantially equal to a temperature of the tip-plate; and a pair of thermocouple wires traversing the tube housing and terminating at the weld junction, thereby providing a measurement of the temperature of the tip-plate.

10. The thermocouple of claim 9 wherein the weld junction is formed coplanar with a surface of the tip-plate.

11. The thermocouple of claim 9 wherein the tube housing is made of platinum.

* * * * *